June 29, 1937.  A. W. ENGEL  2,085,187

CONVERTIBLE MOUNTING CORNER

Filed July 20, 1936   2 Sheets-Sheet 1

Inventor
Albert W. Engel
by his Attorneys.

June 29, 1937.  A. W. ENGEL  2,085,187
CONVERTIBLE MOUNTING CORNER
Filed July 20, 1936  2 Sheets-Sheet 2
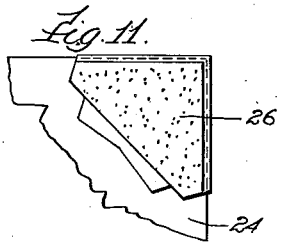
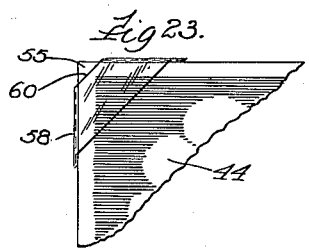
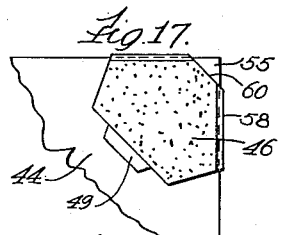
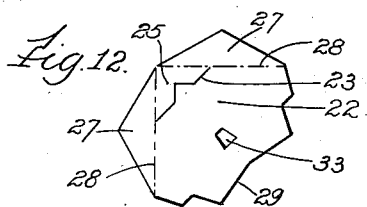
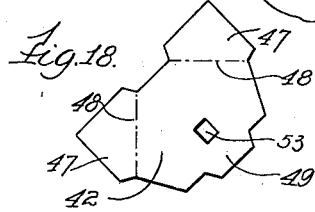
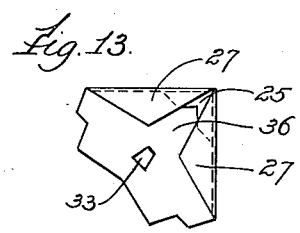
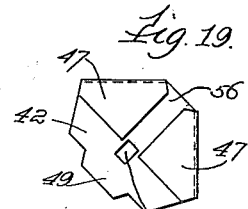
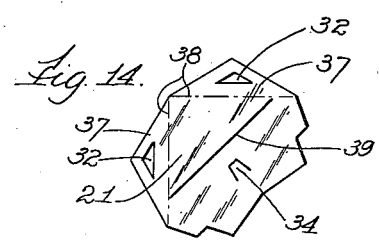
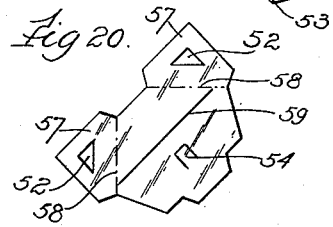
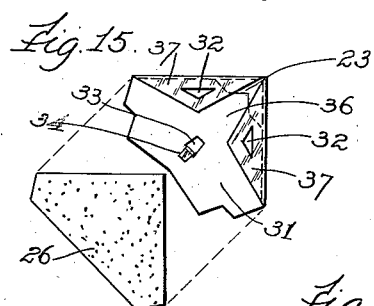
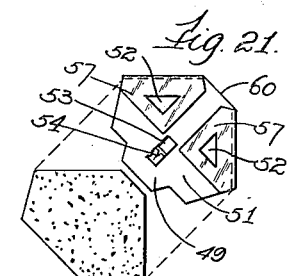
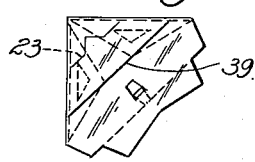
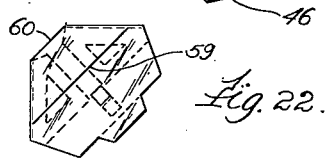
Inventor.
Albert W. Engel.
by his Attorneys.
Witness
H. F. McKnight.

Patented June 29, 1937

2,085,187

UNITED STATES PATENT OFFICE 2,085,187

CONVERTIBLE MOUNTING CORNER

Albert W. Engel, Chicago, Ill.

Application July 20, 1936, Serial No. 91,528

18 Claims. (Cl. 40—158)

This invention relates to mounting corners designed for securing photographic prints, postcards and other like material to a mounting sheet, such as an album leaf or the like, and one object of the invention is to provide a corner which can be manufactured conveniently from transparent sheet material combined with opaque fibrous material such as paper. Another object is to provide a mounting corner which may be used in two ways,—either so as to cover the corner portion of the card or picture with the opaque material of the mounting corner, or to render the corner of the card or picture fully visible through the transparent material. Other objects will appear as the description proceeds. The invention consists in the features and elements of construction in combination as herein shown and described and as indicated by the claims.

In the drawings:

Figure 11 is a back view of a modified form of corner, particularly designed to employ moisture-proof transparent material.

Figure 12 is a face view of the paper blank for said corner.

Figure 13 shows the paper blank with the flaps folded and as seen from the back side.

Figure 14 is a face view of the transparent blank.

Figure 15 is a back view of the paper blank and transparent blank assembled with the gummed backing sheet ready for application thereto.

Figure 16 is a face view of the finished corner embodying this modification.

Figure 17 is a back view similar to Figure 11 showing a further modification.

Figure 18 is a face view of the paper blank for the same.

Figure 19 is a back view of the paper blank with the flaps folded.

Figure 20 is a face view of the blank of transparent material.

Figure 21 is a back view showing the paper blank and transparent blank assembled together with the gummed backing sheet ready for application thereto.

Figure 22 is a face view of the completed corner embodying this modification.

Figure 23 is a face view of the same corner shown in the position of use on a corner fragment of a picture.

This application is a continuation-in-part of my application Serial No. 31,053, filed July 12, 1935.

This application includes certain forms of the invention particularly designed to be constructed with transparent material which is substantially moisture-proof, and which is therefore not easily secured by adhesives. Figures 1 to 10, however, represent a construction which is preferably made of transparent material which is not wholly moisture-proof, so that some reliance can be placed upon the attachment of the transparent material to the paper elements by means of ordinary adhesives.

Figure 1:
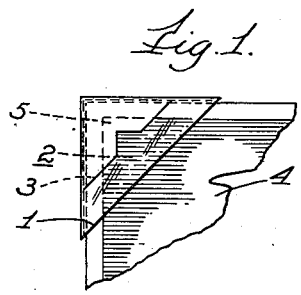
Figure 1 is a face view of a mounting corner embodying this invention shown in the position of use with a fragment of a picture inserted therein, a portion of the picture which it holds being covered by the opaque material of the corner.

As seen in Figure 1, the mounting corner which is the subject of this invention comprises an outer portion of transparent sheet material, 1, which, in the finished device, is of triangular form, though not necessarily of the particular outline illustrated, and which overlies a triangular portion, 2, of opaque sheet material, such as paper, formed with a slit, 3, through which the corner of the card or picture, indicated at 4, may be inserted, so that the extreme corner portion underlies the corner area, 5, of the opaque member. If preferred, the corner portion of the picture, 4, may be slipped between the transparent material, 1, and the opaque material, 2, without insertion through the slit, 3, so that the entire corner area of the picture, 4, remains visible through the transparent material, 1. The mounting device includes a backing sheet, 6, permanently secured to the transparent and opaque elements, and having its outer surface gummed, as indicated by stipling in Figure 3, for securement of the complete device to a mounting sheet or background.

Figure 4:
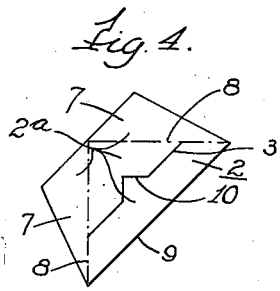
Figure 4 is a face view of the paper blank used in making the corner.

The construction of the mounting corner will be more readily understood upon considering the separate elements of which it is composed. Figure 4 shows a blank of paper or like fibrous sheet material for making the opaque element, 2. It includes the triangular portion which is visible in Figure 1, plus flaps, 7, which are to be folded along the lines 8—8, said lines being disposed at right angles to each other and serving with the edge 9 to define the right-angle-triangular shape of the finished device. The blank also includes the slit, 3, extending generally parallel to the edge, 9, but formed, as a matter of design, with a re-entrant angle at 10. When the flaps, 7, are folded under the triangular area along the lines 8—8, the appearance of the paper pocket thus formed is as indicated in Figure 5, in which the rear face of a portion of the main triangular area adjacent the edge, 9, is exposed at 11 because the flaps, 7, are not dimensioned to fully cover this rear face.

Figure 2:
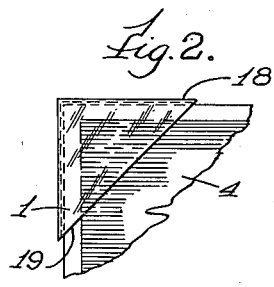
Figure 2 is a similar face view but showing the corner portion of the picture as covered only by the transparent material of the mounting corner.
Figure 3:
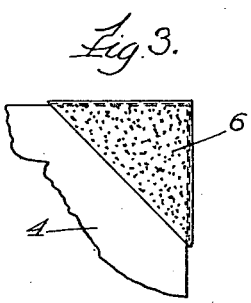
Figure 3 is a back view of the corner as it appears associated with a fragment of a picture ready for use, but before attachment of the corner to a mounting sheet.
Figure 5:
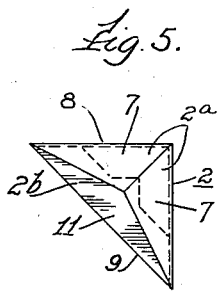
Figure 5 shows the paper blank folded and as seen from the back side.
Figure 6:
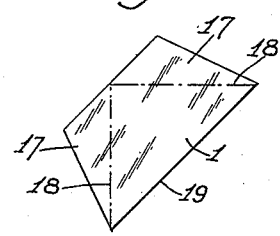
Figure 6 shows the blank of transparent material.
Figure 8:
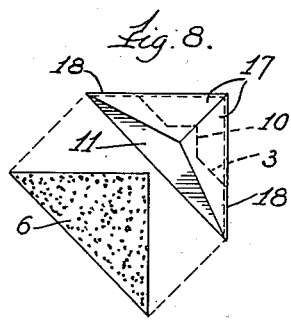
Figure 8 shows the backing sheet of gummed material ready for assembly with the paper and transparent elements.
Figure 7:
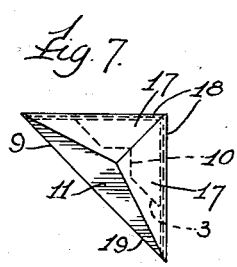
Figure 7 shows the transparent blank as folded over the paper portion and as seen from the back side.
Figure 9:
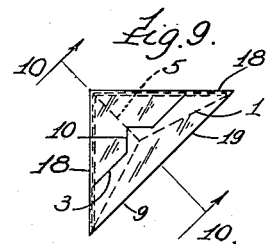
Figure 9 shows a completed corner as viewed from the front, and ready for use.
Figure 10:
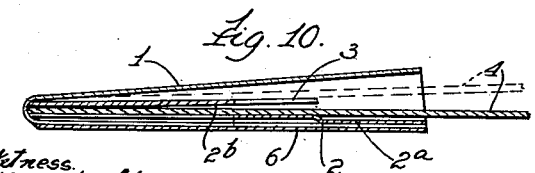
Figure 10 is a transverse section taken as indicated at line 10—10 on Figure 9.

The blank of transparent material, as shown in Figure 6, is of the same shape as the blank of the paper material and includes a main triangular area, 1, with flaps, 17, adapted to be folded thereunder along the lines, 18, which will then form two sides of the triangular area, 1, the third side, 19, being the hypotenuse. When this blank is folded over the folded paper element previously formed, as shown in Figure 5, it will just embrace the paper pocket, and from the back will appear as in Figure 7. A triangle of paper or like sheet material, gummed on both sides, is represented at 6 in Figure 8, ready to be applied to the outwardly exposed surfaces of the folded flaps, 17, of the transparent material and the rearwardly exposed area, 11, of the paper pocket for permanently assembling the parts. When it has been secured in place, the double pocket, composed of an outer pocket of transparent material and an inner pocket of opaque material, is ready to receive the corner of the card or picture, 4, and to be attached adhesively to any suitable mounting surface, not shown. As seen in Figure 10, the effect of the adhesive securement of the area, 11, to the backing sheet, 6, will be to tend to offset this portion of the paper wall from the part at the opposite side of the slit, 3, so that the slit will be in readiness to receive the corner of the picture if the latter is to be inserted in the small opaque pocket bounded by the folded edges, 8, 8, and the slit, 3, said slit defining the opening of the opaque pocket lying within the area of the larger pocket composed of the transparent material, as shown in Figure 1. However, the stiffness of the materials composing the pocket will preclude creasing them sharply at 8 and 18; consequently, the transparent upper wall, 1, will tend to stand away from the lower wall so as to facilitate insertion of the corner of the card entirely above the paper pocket and just under the transparent wall, 1, as shown in Figure 2 when this arrangement is preferred.

As indicated in Figures 4 and 5, the upper or outer surface of the paper element, 2, of the pocket is denoted by the numeral 2ª. This surface may be treated in any desired decorative manner, as for example, with color or in gilt or silver, or with a printed design. The opposite surface, 2ᵇ, is preferably coated with adhesive gum which becomes available upon moistening, and which may be of the same general nature as the gum applied to the outer surface of the backing sheet, 6. Then when the corner of the picture, 4, is inserted through the slit, 3, as shown in Figure 1, it may be permanently secured if the corner of the picture is moistened before insertion, and the parts are then pressed firmly together, causing the adhesive gum on the under side of the area, 5, to adhere to the surface of the picture, 4.

For the manufacture of this mounting corner I may use any suitable grade of paper as the opaque material, and may employ as the transparent material the product commercially known as "Cellophane". This transparent sheet material is available in a moisture-proof form, and also in a non-moisture-proof composition. With the material which is not moisture-proof the ordinary gum used on the backing sheet, 6, will cause the latter to adhere firmly to the flaps, 7, of the transparent material. However, for some purposes the moisture-proof quality is more satisfactory, and when this is used I find it preferable to employ with it a special "laminated" paper stock for the opaque element of the corner. This laminated stock consists of a layer of paper having a thin layer of cellophane permanently united to one surface. The other surface may carry any suitable gum which is rendered adhesive by the application of ordinary moisture. This laminated stock is used both for the paper pocket element, 2, and for the backing sheet, 6. The cellophane-coated surface of the paper stock is arranged as the under surface, 2ᵇ, of the element, 2, while the upper surface, 2ª, may be coated with the usual adhesive gum which is sufficiently transparent so that if this surface is also colored, or otherwise decorated, the presence of the gum will not interfere with the visibility of the decoration. The surface of the backing sheet, 6, which is to be placed in contact with the surface of the transparent flaps, 7, is the cellophane-coated surface of this sheet. By the use of a suitable solvent, such as acetone, these surfaces of the flaps and the backing sheet are softened so that when pressed into contact they become firmly united as the coating re-hardens. At the same time the solvent is applied to the under side of the paper at the area, 11,—this being the cellophane-coated side,—and, as a result, this portion of the paper pocket will be firmly attached to the backing sheet in its proper relation to the transparent pocket.

If it is desired to secure the corner of the picture, 4, permanently in the pocket, it will be moistened in the usual way before insertion, and will adhere to the upwardly-exposed area between the slit, 3, and the edge, 9, which, in this construction, is coated with ordinary gum.

For many purposes it is desirable to use a grade of transparent material which is substantially moisture-proof; cellophane is made in this form as well as in a non-moisture-proof form. When the moisture-proof material is employed most adhesives will not bond satisfactorily with it, and I have therefore devised certain special expedients to ensure that the parts of the corner pocket will remain permanently assembled. Figures 11 to 16 show one form of corner embodying these features.

The pocket is composed of a paper blank, 22, having a diagonal slot, 23, into which the corner of the picture or card, 24, may be inserted if it is desired to have the corner area, 25, overlie the extreme corner of the picture. The blank, 22, includes flaps, 27, which are folded along lines, 28, at right angles to each other so that from the reverse side the blank appears as seen in Figure 13 when the flaps have been folded. The transparent blank is similar in shape to the paper blank, 22, including flaps, 37, folded along lines, 38, so that when the two blanks are assembled together these flaps overlie the flaps, 27, of the paper, as seen in Figure 15. The flaps, 37, have apertures, 32, through which small areas of the paper flaps, 27, are thus exposed for adhesive securement to the backing sheet, 26, which, it may be understood, is gummed on both sides so that one surface serves to hold the parts of the pocket in assembled relation while the other surface is left outwardly exposed for attaching the completed pocket to a mount when it is placed in use.

In addition to the areas of the paper flaps, 27, which are exposed through apertures, 32, a considerable area, 31, of the paper extends beyond the flaps at the inner end of the corner, that is, the portion remote from the apex, and, preferably, the flaps, 27 and 37, are formed so that their edges do not meet when folded under against the back surface of the corner but leave an exposed area, 36, between them. Thus the backing sheet, 26, will adhere firmly to the areas, 31 and 36, and will lock the flaps in their folded relation by adhering to the small areas of the paper flaps exposed through the openings, 32, in the transparent material. As an additional precaution I may form the area, 31, of the paper with an aperture, 33, through which a small tongue, 34, of the transparent material is projected and folded down against the back side of the paper so as to be anchored in this position when the backing sheet, 26, is applied. When the parts are thus assembled the finished pocket presents the appearance indicated in Figure 16, the transparent material having a diagonal slot, 39, through which the corner of the card or picture is always inserted, whether it is also slipped through the slot, 23, or merely carried past it. Thus the final result may be either like that shown in Figure 1, or as shown in Figure 2, but with the form of pocket just described there is an additional area of transparent material extending beyond the slit, 39, and a correspondingly larger area of the backing sheet, 26, exposed for attachment to the mounting surface.

Figures 17 to 23 illustrate a further modification constructed in accordance with the same principles as that shown in Figures 11 to 16, but with the extreme corner of the pocket omitted so that the picture has the appearance of being secured by a diagonally extending transparent strap at each corner, as seen in Figure 23. In this form the paper blank, 42, has flaps folded along lines 48 to form the pocket. The transparent blank is of similar outline, having tabs, 57, folded at lines 58, and having apertures, 52, in the tabs through which the adhesive on the surface of the backing sheet, 46, may bond with the surfaces of the paper tabs, 47, when the two blanks are assembled. The paper blank also has an aperture, 53, and the transparent blank is formed with a tab, 54, to be projected through the opening, 53, and folded over, as seen in Figure 21, so as to be anchored by application of the backing sheet, 46. In this form of pocket the edges of the flaps, 47 and 57, may be designed so that they are parallel to each other when folded over, but they are so dimensioned that they do not meet, and thus there is left exposed between these edges of the tabs an area of the back surface of the paper available for adhesive securement to the backing sheet, 46. In addition to the interlocking effect provided by the apertures, 52, as between the transparent blank and the paper blank, the space between the tabs, 57, may be formed so that it flares or widens outwardly toward the diagonal edge, 60, of the pocket past which the corner portion, 55, of the picture or card, 44, will extend when the picture is mounted in the pocket, as seen in Figures 17 and 23. The flared area of paper thus exposed at 56 allows the backing sheet to become firmly adherent to the paper blank along the edge, 60, thus further securing the elements of the pocket firmly together.

In the blank shown in Figure 12 the outline, 29, is merely that which results from making the blanks in a continuous series from a strip without intervening scrap material, and, similarly, in Figure 18, the outline of the blank at 49 is the result of forming these blanks contiguously from the sheet or strip from which they are cut. It is not essential that the gummed backing sheets, 26 and 46, correspond exactly with these outlines, and, as shown, they are cut off along straight lines so that they do not quite cover the entire areas of the paper elements, 22 and 42. This, however, is a matter of convenience in manufacture and does not affect the functioning of the pocket.

I claim:

1. A mounting corner which includes a pocket of opaque sheet material within a pocket of transparent sheet material, the opaque pocket opening in the same direction as the transparent pocket but along a line within the area of the latter, said transparent pocket including a back wall which overlaps less than the entire area of the back wall of the opaque pocket, and a backing sheet adhesively secured to the back wall of the transparent pocket and to a portion of the back wall of the opaque pocket for securing said pockets in assembled relation.

2. A mounting corner which includes a pocket of opaque sheet material permanently secured within a pocket of transparent sheet material, the opaque pocket opening in the same direction as the transparent pocket but along a line within the area of the latter; the wall of the opaque pocket adjacent the outer wall of the transparent pocket being separable therefrom to permit insertion of a card or picture between said walls for display through the transparent one.

3. A mounting corner which includes a triangular area of opaque sheet material with flaps folded under it at two edges, a triangular area of transparent sheet material overlying the opaque material to form a pocket with flaps folded around two edges of the opaque material to embrace it and a backing sheet adhesively secured to the transparent flaps; the flaps of transparent material overlapping less than the entire area of the opaque pocket and the backing sheet being adhesively secured to the area of opaque material not covered by said flaps.

4. A mounting corner which includes a triangular area of opaque sheet material with flaps folded under it along two edges, said material having a slit extending from one of said edges to the other and parallel to the general direction of the third edge of the triangle, together with a triangular area of transparent sheet material overlying the slit area of the sheet material and having flaps folded around the aforesaid folded edges of the opaque material to embrace the latter, said flaps of transparent material overlapping less than the entire under surface of the opaque material, and a backing sheet adhesively secured to an area thereof not covered by said flaps, the main triangular areas of both parts being left unattached to each other to permit the insertion of the corner of a card or picture between them.

5. A mounting corner which includes a triangular pocket of transparent sheet material with a triangle of opaque sheet material secured in the pocket, said opaque material having a slit extending substantially parallel to the open edge of the pocket and spaced back therefrom, and a backing sheet to which an area of the opaque material between its slit and the open edge of the pocket is secured.

6. A mounting corner which includes a top wall of opaque sheet material gummed on its under side and formed with a slit for the insertion of the corner of a card or picture, an outer top wall of transparent material with flaps folded under the opaque material along two edges, and means securing said parts in such assembled relation, said means including an exposed gummed back area for adhesively securing the corner to a mount.

7. A mounting corner which includes a triangular area of opaque sheet material gummed on its under side and formed with flaps folded under said triangular area at two edges, a triangular area of transparent sheet material overlying the opaque material to form a pocket with flaps folded around said folded edges of the opaque material to embrace it, and a backing sheet adhesively secured to the transparent flaps and to a portion of the gummed under surface of the opaque material.

8. A mounting corner composed of transparent sheet material and opaque sheet material, the transparent material being water-proof and the opaque material being laminated and composed of a layer of fibrous material coated on one surface with a water-proof transparent coating similar to the transparent sheet material and on the opposite surface with a non-water-proof gum, the opaque sheet being disposed under the transparent sheet with its gummed surface uppermost, and the transparent material extending over the other with flaps folded around it along two edges substantially at right angles to each other, and a backing sheet of the laminated material disposed with its water-proof surface uppermost and adhesively secured to the flaps of the transparent material by the use of a common solvent, said backing sheet being also secured to a portion of the water-proof under surface of the opaque element for holding the parts in assembled relation.

9. A mounting corner composed of transparent sheet material and opaque sheet material, the transparent material being water-proof and the opaque material being laminated and composed of a layer of fibrous material coated on one surface with a water-proof transparent coating similar to the transparent sheet material and on the opposite surface with a non-water-proof gum, the opaque sheet being disposed under the transparent sheet with its gummed surface uppermost, and with flaps folded under along two edges substantially at right angles to each other, and having a slit extending obliquely from one of the folded edges to the other, and the transparent material extending over the other with flaps folded around it along the said folded edges thereof, and a backing sheet of laminated material disposed with its water-proof surface uppermost and adhesively secured to the flaps of the transparent material by the use of a common solvent, said backing sheet being also secured to a portion of the water-proof under surface of the opaque element and disposed at one side of the slit only, whereby the corner portion of a card or picture may be inserted under the part of the opaque element at one side of the slit, and extending through the slit, may be adhesively secured to the upper and gummed surface of said opaque element.

10. A mounting corner which includes a top wall of opaque sheet material with flaps folded under it at two edges extending substantially at right angles to each other, said wall having a slit extending obliquely from one of said folded edges to the other, an outer wall of transparent sheet material overlying the opaque wall and having flaps folded around the said folded edges of the opaque material to embrace it and forming a pocket opening along a line substantially parallel to the aforesaid slit but spaced therefrom, and a backing sheet adhesively secured to the transparent flaps gummed on its back surface for securing the pocket to a mount.

11. A mounting corner which includes a pocket of opaque sheet material within a pocket of transparent sheet material, the opaque pocket opening in the same direction as the transparent pocket but along a line within the area of the latter, and means permanently securing said opaque pocket fixedly within the transparent pocket; the wall of the opaque pocket adjacent the outer wall of the transparent pocket being unattached to the latter and separable therefrom to permit the insertion of a card or picture between said walls for display through the transparent wall.

12. A mounting corner which includes an area of opaque sheet material with flaps folded under it at two edges, an area of transparent sheet material overlying the opaque material to form a pocket with flaps folded around the said two edges of the opaque material to embrace it, said flaps of the transparent material having apertures exposing areas of the opaque material, and a gummed backing sheet adhesively secured over the transparent flaps and bonded to the opaque material through said apertures.

13. A mounting corner which includes an area of opaque sheet material formed with two edges extending substantially at right angles to each other, an area of transparent sheet material overlying the opaque material with flaps folded around the said two edges of the opaque material to embrace it and form a pocket, said flaps having apertures exposing portions of the opaque material, and a backing sheet adhesively secured over said flaps and bonded with the opaque material through the apertures.

14. A mounting corner which includes an area of opaque sheet material formed with two edges at right angles to each other, an area of transparent sheet material overlying the opaque material to form a pocket with flaps folded around the said two edges of the opaque material embracing it, said flaps being shaped to expose a substantial area of the opaque material, and a backing sheet adhesively secured to said exposed area and overlapping the flaps of the transparent material.

15. A mounting corner which includes an area of opaque sheet material formed with two edges at right angles to each other, an area of transparent sheet material overlying the opaque material and including flaps folded around said two edges of the opaque material to embrace it, said transparent material having a slit extending diagonally between said two edges around which its flaps are folded, the opaque material having an aperture at the opposite side of the slit from that at which said edges converge, and the transparent material having a tongue extending through said aperture and folded back against the opaque material at the under side thereof, together with a backing sheet adhesively secured to said under surface of the opaque material overlapping the flaps and the tongue for holding the transparent material in place.

16. A mounting corner which includes an area of opaque sheet material formed with two edges at right angles to each other, an area of transparent sheet material overlying the opaque material with flaps folded around the said two edges of the opaque material to embrace it and form a pocket, the transparent material having a slit extending diagonally between said two edges, the area of said transparent material defined by said slit and said edges being unattached to the adjacent opaque material, and means for holding the remainder of the upper area of transparent material in close contact with the opaque material to facilitate entering a card or a picture in the pocket through the slit.

17. A mounting corner which includes an area of opaque sheet material formed with two edges at right angles, an area of transparent sheet material overlying the opaque material with flaps folded around said two edges of the opaque material to embrace it and form a pocket, said flaps when folded against the under face of the opaque material having their adjacent edges formed with portions diverging toward the apex of the right angle formed by the aforesaid edges and exposing an area of opaque material between them, and a backing sheet adhesively secured to said exposed area and thereby locking the transparent material to the opaque material.

18. A mounting corner which includes an area of opaque sheet material formed with two edges at right angles, an area of transparent sheet material overlying the opaque material with flaps folded around said two edges of the opaque material to embrace it and form a pocket, said flaps when folded against the under face of the opaque material having their adjacent edges in the vicinity of the apex of the right angle spaced apart more widely than the portions of said edges remote from said apex and exposing an area of the opaque material between them, and a backing sheet adhesively secured to said exposed area for locking the transparent material in position over the opaque material.

ALBERT W. ENGEL.